April 8, 1952 W. C. DUNLAP, JR 2,592,257

HALL EFFECT DEVICE

Filed Nov. 15, 1950

Inventor:
William C. Dunlap, Jr.
by Paul A. Frank
His Attorney.

UNITED STATES PATENT OFFICE 2,592,257

HALL EFFECT DEVICE

William C. Dunlap, Jr., Schenectady, N. Y., assignor to General Electric Company, a corporation of New York Application November 15, 1950, Serial No. 195,889

7 Claims. (Cl. 323—63)

Figure 1:
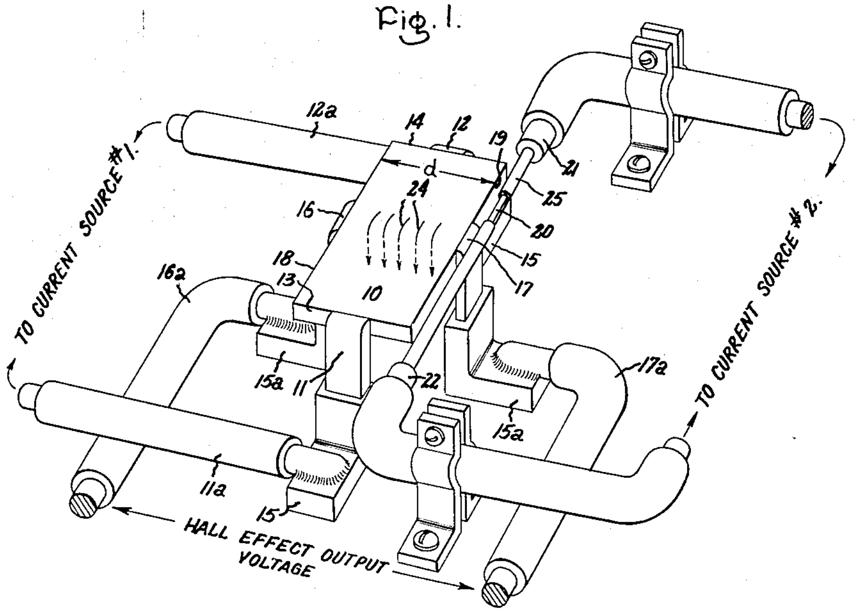

My invention relates to apparatus, such as measuring instruments and computing devices which utilize a potential difference generated along one axis of a certain type of metallic plate when the plate is subjected to an orthogonal axis current under the influence of a magnetic field perpendicular to the plane of the plate. This potential difference producing phenomenon has become known as the "Hall effect."

Certain metallic plates, such as thin wafers of properly prepared germanium, known as "Hall plates" exhibit this Hall effect to a marked degree; in other words, have a high "Hall coefficient." In most electric devices employing such Hall plates, a magnetic field perpendicular to the plane of the plate, is produced by placing the respective poles of a permanent magnet or of an electromagnet on opposite sides of the plate. In order to provide a magnetic field which is strong enough to produce appreciable Hall potentials with a small current through the plate, the pole pieces must ordinarily be placed fairly close to the faces of the plate, which results in considerable undesirable capacitive and inductive coupling to the Hall plate circuit. Moreover, if an electromagnet is used, similar fairly large resistive and reactive components are introduced into the field producing circuit. These resistive, capacitive, and inductive effects normally limit the application of such Hall effect devices to low frequency apparatus. If the magnetic poles are placed further away from the Hall plate in an attempt to minimize such coupling effects, an unusually strong magnetic field must be produced in order to obtain the desired high flux density through the plate, and this necessitates rather expensive and cumbersome field producing elements.

Accordingly, one object of my invention is to provide a Hall effect device having a simple and economical magnetic field producing element capable of producing strong electric fields without the use of permanent magnets or electromagnets.

Another object of my invention is to provide a Hall effect device having a magnetic field producing element which introduces no appreciable inductance, resistance or capacitance into the field producing circuit with the result that the magnetic field may be varied from a unidirectional field up to a high frequency alternating field without substantial loss of power.

A further object of my invention is to provide a Hall effect device in which there is little capacitive or inductive coupling between the Hall plate and the magnetic field producing element with the result that currents ranging from unidirectional up to very high frequency alternating currents may be passed through the Hall plate with little interference or loss due to the magnetic field producing element.

In general, my improved Hall effect device comprises a very fine electric conductor, preferably in the form of a wire or filament, located in close proximity to a thin Hall plate and extending parallel to the current carrying axis of the plate, preferably along one edge of the plate. By causing a fairly large current to be passed through this fine conductor, an usually strong magnetic field is produced around the fine wire. By locating the wire adjacent to the surface of the plate and parallel to the current carrying axis thereof, the strong magnetic field produced by the wire passes through the plate in a direction substantially perpendicular to the plane of the plate and extends along the entire path of current through the plate to provide a very sensitive Hall effect device. Since the magnetic field producing element is merely a highly conductive wire of small diameter, this field producing element introduces no appreciable resistance, inductance or capacitance into the field producing circuit of the device. Moreover, since the area of this fine conductor which is adjacent the Hall plate is much smaller than that which exists with magnetic pole pieces, undesirable coupling between the magnetic field producing element and the primary current circuit of the Hall plate is appreciably reduced.

In a preferred embodiment of my invention, the Hall effect device is constructed by securing a small diameter wire having a thin insulating coating along or adjacent one edge of a Hall plate parallel to the current carrying axis of the plate. Suitable electrodes are also secured to the two pair of opposing edges of the plate, one pair of electrodes for connection to a primary input current source and the other pair of electrodes for receiving the transverse potential differences produced by the interaction of the magnetic field and the input current flowing in the Hall plate. The output voltage produced across these latter electrodes is proportional to the product of the current supplied to the opposing pair of electrodes and the current supplied to the fine conductor. As a result, an extremely versatile Hall effect device is produced since either of these two input currents may be varied from a unidirectional current up to very high frequencies while the other current is maintained at a constant value to provide an output voltage representing the variation of one input current. Alternatively, both currents may be varied simultaneously in order to produce an output voltage representing the product of the two input currents.

Figure 2:
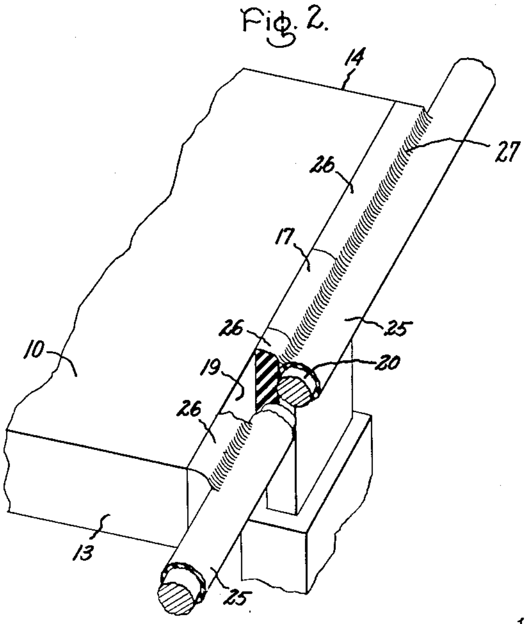

The novel features of my invention can best be understood by reference to the following description taken in connection with the accompanying drawing in which Fig. 1 is an enlarged perspective view of a Hall effect device produced in accord with my invention, and Fig. 2 is an enlarged perspective view of a section of the device of Fig. 1 illustrating a preferred construction of the magnetic field producing element thereof.

Referring to Fig. 1, I have shown my invention as comprising a thin Hall plate 10, preferably germanium of high resistivity ranging from 1 to 50 ohms per centimeter, and large Hall coefficient, preferably in the neighborhood of $10^{-4}$ volt-centimeters per ampere-gauss of input energy. A pair of input connections, such as electrodes 11 and 12 are secured in conductive relation with opposite edges 13 and 14 respectively of the Hall plate 10 to enable a current to be passed through the Hall plate along one major axis thereof, herein called the longitudinal axis, when the electrodes 11 and 12 are connected through supporting terminals 15 and suitable conductors 11a and 12a to a source of electrical energy, designated as current source 1 which may be either alternating or direct current as desired in the destined application of the device. Similarly, output connections, such as electrodes 16 and 17, are secured in conductive relation with the remaining opposite edges 18 and 19 respectively of Hall plate 10 to receive the transverse potential difference produced along an axis perpendicular to the input current carrying axis of plate 10 by the interaction of a magnetic field and the longitudinal current through plate 10. This "Hall effect voltage" may be supplied to a suitable indicating device or other utilization circuit through supporting terminals 15a and conductors 16a and 17a.

Electrodes 11, 12, 16 and 17 may merely be pressed against the edges of plate 10 but are preferably actually soldered or welded thereto. Welding of the electrodes to a germanium plate 10 may be accomplished by following well known techniques for welding cat-whisker electrodes to germanium pellets in point contact rectifiers. The amount of welding current employed depends upon the size of the contact and the type of material of which the electrode is composed. Platinum electrodes having a contact area of .0005 square inches may normally be welded to the plate 10 by passing a welding current of about ½ ampere through the electrode and plate for a few seconds. By employing a positive type germanium plate with platinum electrodes, a non-rectifying welded connection may be thus produced. Alternatively, electrodes 11, 12, 16 and 17 may be conductive films bonded to the edges of the plate by a suitable cement or may be a conductive metal evaporated thereon.

In order to produce the requisite magnetic field cutting the Hall plate 10 in a direction perpendicular to the plane of the plate 10, a magnetic field producing element comprising a very fine elongated conductor 20, preferably in the form of a small diameter copper wire, is located adjacent one edge of the plate such as edge 19 and extends parallel to the direction of primary current flow through the plate. This fine conductor 20 is arranged to be connected through suitable heavier heat-dissipating conductors 21 and 22 to a suitable source of electric potential, designated as current source #2, whereby a substantial current flows in the conductor 20 which, in turn, produces a strong magnetic field encircling conductor 20 in planes perpendicular to the direction of current flow in conductor 20. If conductor 20 is mounted adjacent one edge of the Hall plate 10, as indicated, this magnetic field cuts the longitudinal axis of the Hall plate in a direction substantially perpendicular to the plane of the plate, as illustrated by arrows 24. Two conductors similar to conductor 20 may obviously be mounted adjacent opposite edges 18 and 19 of Hall plate 10 and connected together in series with current source #2. Instantaneous current from source #2 then flows in opposite directions in the two conductors so that the magnetic fields produced by both conductors cut Hall plate 10 from the same additive direction.

In order to take full advantage of the Biot-Savart law which states that $$H=\frac{2i}{r}$$

gauss, where $i$ is the current in emu and $r$ is the radius of the conductor, it is preferable to employ an extremely fine wire for conductor 20 and to pass an appreciable current through this conductor. Although larger diameter wires carrying even stronger currents may be employed, it is preferable, for most instrument apparatus, that the diameter be no greater than .005 inch and preferably in the neighborhood of .002 inch. Moreover, the wire must be located in close proximity to Hall plate 10. For this purpose I have found it preferable to employ a conductor 20 having a thin insulating coating 25 and to mount the insulated conductor 20 directly upon an edge 19 of the Hall plate. One convenient manner of mounting conductor 20 to the edge of plate 10, is illustrated in Fig. 2. A pair of insulating spacers 26 are cemented or otherwise secured along the edge 19 of plate 10 on opposite sides of electrode 17. The conductor 20 with its thin insulating coating 25 is then secured to the spacers 26 and electrode 17 by any suitable bonding means 27 such as a thermo-plastic cement. The insulating spacers and bonding means employed should be of a type pervious to magnetic fields.

In order to prevent non-linearity of the output voltage due to an appreciable field gradient along the transverse dimension of the plate produced by the greater attenuation of the magnetic field at points more remote from conductor 20, it is preferable that the transverse dimension "$d$" of the Hall plate be no greater than eight times the diameter of the wire. The thickness of plate 10 should also be very small, preferably not more than three times the diameter of the fine conductor 20 in order that the magnetic flux produced by the conductor will cut the Hall plate 10 in a directon perpendicular to the plane of the plate. The longitudinal dimension is not very critical, although it is preferably of an order of magnitude comparable with the transverse dimension to facilitate the construction of plate 10 and to minimize coupling between the conductor 18 and the plate 10.

Typical dimensions which are suitable for the plate 10 and conductor 20 are as follows:

Diameter of conductor 20=.002″
Distance between conductor 20 and edge of Hall plate 10 (thickness of insulating coating 21 and spacers 26)=.002″
Transverse dimension of Hall plate=.008″
Thickness of Hall plate=.003″
Longitudinal dimension of Hall plate=.025″

A Hall effect device constructed as described above and carrying a current of one or two amperes through conductor 20 is capable of producing output Hall potentials between electrodes 16 and 17 of the order of several millivolts with a primary current through the plate 10 of a few milliamperes. Output voltages of this magnitude may be easily amplified and employed in many different types of electrical circuits. Since the ouput voltage of the device has a substantially flat input frequency response characteristic, the device is admirably suited for high frequency current measurement. Moreover, since the output voltage accurately represents the product of the Hall plate current and the conductor 20 current, the device is also well-suited for use in electric computing apparatus. The small size of the device is also a marked advantage in this respect since it is often desired to place a great number of such current multiplying units within a comparatively small space in such computers.

It is to be understood that although I have shown a specific embodiment of my invention many modifications can be made, and I intend, therefore, by the appended claims, to cover all such modifications as fall within the true spirit and scope of my invention.

What I claim as new and desire to secure by Letters Patent of the United States is:

1. A Hall effect device comprising a Hall plate, input electrodes connected to said plate for delivering a current through said plate along one axis thereof, output connections to said plate for receiving a potential difference generated along an axis of said plate transverse to said current carrying axis, and an elongated conductor having a diameter less than the thickness of said Hall plate located adjacent an edge of said plate parallel to the current carrying axis thereof for producing a magnetic field substantially perpendicular to the plane of said plate when a current is passed through said conductor.

2. A Hall effect device comprising a Hall plate having two pair of opposite edges extending mutually perpendicular to each other, connections to one pair of opposite edges for delivering a current through said plate along one axis thereof, connections to the other pair of opposite edges for receiving a potential difference generated along an axis of said plate transverse to said current carrying axis, and an elongated conductor located adjacent an edge of said plate parallel to the current carrying axis thereof for producing a magnetic field substantially perpendicular to the plane of said plate when a current is passed through said conductor, said plate having a transverse axis dimension no greater than eight times the diameter of said conductor and a thickness no greater than three times the diameter of said conductor.

3. A Hall effect device comprising a Hall plate having two pair of opposite edges extending mutually perpendicular to each other, an input electrode on each of one pair of opposite edges for delivering a current through said plate along one axis thereof, a conducting wire having an insulating coating secured to an edge of said plate parallel to the current carrying axis thereof for producing a magnetic field substantially perpendicular to the plane of said plate when a current is passed through said wire, and an output electrode on each of the other pair of opposite edges of said plate for receiving a potential difference generated along an axis of said plate transverse to said current carrying axis.

4. A Hall effect device comprising a thin Hall plate having two pair of opposite edges extending mutually perpendicular to each other, an input electrode on each of one pair of opposite edges for delivering a current through said plate along one axis thereof, a conducting wire having an insulating coating secured to an edge of said plate parallel to the current carrying axis thereof for producing a magnetic field substantially perpendicular to the plane of said plate when a current is passed through said wire, and an output electrode on each of the other pair of opposite edges of said plate for receiving a potential difference generated along an axis of said plate transverse to said current carrying axis, said wire having the diameter no greater than .005 inch, said plate having a transverse axis dimension no greater than eight times the diameter of said conductor and a thickness no greater than three times the diameter of said conductor.

5. A Hall effect device comprising a rectangular germanium Hall plate, connections to one pair of opposite edges of said plate for delivering a current through said plate along the longitudinal axis thereof, connections to the other pair of opposite edges of said plate for receiving a potential difference generated along the transverse axis thereof, and a wire having an insulating coating secured along an edge of said plate parallel to the longitudinal axis thereof for producing a magnetic field substantially perpendicular to the plane of said plate when a current is passed through said wire, said wire having a diameter no greater than .005 inch, said plate having a transverse dimension no greater than eight times the diameter of said conductor and a thickness no greater than three times the diameter of said conductor.

6. Hall effect apparatus comprising a Hall plate, a first source of electric current, connections from said first current source to said plate for delivering a current through said plate along one major axis thereof, a second source of electric current, a conductor having a diameter less than the thickness of said Hall plate connected across said second current source and extending adjacent an edge of said plate parallel to the current carrying axis thereof for producing a magnetic field perpendicularly cutting said plate, and a pair of output connections to said plate for receiving a potential difference generated along an axis of said plate transverse to the current carrying axis thereof, which potential difference represents the product of the currents from said first and second source.

7. Hall effect apparatus comprising a thin Hall plate having two pair of opposite edges extending mutually perpendicular to each other, a first source of electric current, connections from said first current source to one pair of opposite edges of said plate for delivering a current through said plate along one axis thereof, a second source of electric current, an elongated conductor connected across said second current source having a diameter no greater than .005 inch and extending adjacent an edge of said plate parallel to the current carrying axis thereof for producing a magnetic field through said plate substantially perpendicular to the plane of said plate and responsive in magnitude to the current from said second source, and a pair of output connections to the other pair of opposite edges of said plate for receiving a potential difference generated along an axis of said plate transverse to said current carrying axis, which potential difference represents the product of the currents from said first and second sources.

WILLIAM C. DUNLAP, Jr.

REFERENCES CITED

The following references are of record in the file of this patent:

UNITED STATES PATENTS

| Number | Name | Date |
|---|---|---|
| 1,998,952 | Edgar | Apr. 23, 1935 |